(No Model.)

S. A. BLAKE.
HORSE RAKE.

No. 433,068. Patented July 29, 1890.

WITNESSES
Lendell A. Conner Jr
Edward Cashman

INVENTOR
Samuel A. Blake
by
Benj. R. Catlin

UNITED STATES PATENT OFFICE.

SAMUEL A. BLAKE, OF OSCEOLA, IOWA.

HORSE-RAKE.

SPECIFICATION forming part of Letters Patent No. 433,068, dated July 29, 1890.

Application filed October 16, 1889. Serial No. 327,143. (No model.)

*To all whom it may concern:*

Be it known that I, SAMUEL A. BLAKE, a resident of Osceola, in the county of Clarke and State of Iowa, have invented certain new and useful Improvements in Rakes; and I do hereby declare the following to be a full, clear, and exact description of the invention, such as will enable others skilled in the art to which it pertains to make and use the same.

The object of the invention is to improve the construction of a rake, whereby its efficiency and ease and certainty of operation are increased; and the invention consists in the construction hereinafter set forth and pointed out.

In the accompanying drawing, the figure represents a perspective view, partly in section, of the improved rake.

The reference-numerals 1, 2, and 3 denote longitudinal bars of the main frame, of which 4 4 are end bars, and 5 5 and 6 6 diagonal braces or bars, the inner ends of which are secured between the bars 1 and 2, as indicated. These braces are also fastened to bar 3. The frame is further braced by rod 7. The rake-teeth are attached to the two lower bars 2 and 3 of the main frame, and underneath the outside teeth are secured bracket-straps 8 8, bent in the shape indicated, to form long slots to receive an axle 9. These slots extend from near the rear of the frame a considerable distance toward the front to permit a backward and forward movement of the axle, as will be hereinafter described.

Outside the wheels 10 10 sleeves or thimbles 11 11 are arranged on the axle, and at each end of these sleeves are secured braces or guards 12, 13, 14, and 15, the upper ends of said guards being fastened to the shafts 16, which they support from the axle or sleeves in a manner to permit them to freely move about said axle. These guards and also the guard or brace 17 effectually protect the wheels from being clogged by grass or straw. Horses or other animals are hitched to the rake by means of hooks 17' or in any convenient manner.

On the bar 1 is secured a bracket 18, to the top of which is attached a frame or bar 19 to support a seat 20. The seat-frame is further supported by braces 21. Underneath the seat is a wheel having its axle journaled in a frame 22, hinged to the bar 3. Its upward movement about its hinge is limited by the rearward extension 23 of the main frame, which extension also supports the feet of the driver. On the upper side of the seat-frame is secured a rack 24, the teeth of which are adapted to hold, when desired, a lever 25, hinged to the main frame. A cord 26 is attached to this lever and passed about pulleys journaled between the bracket 18 and the bar 1, and thence around pulleys similarly journaled in the outwardly-extended ends of bars or braces 5, each end of the cord or chain being secured about the axle or axle-sleeve. When the lever 25 is held in the position illustrated, this rope or chain is taut and the axle is held at the rear of the slots in which it has bearings. This is the proper position of the parts when the rake is gathering its load. After it has been loaded the teeth and their superincumbent burden are raised from the ground and the axle moved forward, so that the weight of the driver and of the rear part of the frame shall counterbalance the loaded rake by disengaging the lever from the rack, whereupon the cord is slackened, and the draft upon the axle will draw it forward to the front ends of the slots. The load being thus balanced over the wheels and the teeth raised above the ground can be transported to any desired place—as, for example, to a hay-stacking machine arranged and adapted to take the load from the rake.

By means of the lever and rope the rake can be balanced, so as to sustain the teeth above the ground until the raking operation is about to be resumed, whereupon the lever can be pulled back sufficiently to bring the axle to the rear of its bearings and permit the teeth to drop to the ground, ready for work.

In the above-described operation the center wheel limits the tipping or counterbalancing of the machine, as it acts as a stop as soon as the rake is tilted backward sufficiently to depress the rear extension 23 upon the wheel-frame 22.

Having thus described my invention, what I desire to secure by Letters Patent is—

1. In a rake, the main frame and rake-teeth forming part thereof and provided with horizontal slots, and the movable axle provided with hooks for attaching horses and having bearings in the slots, in combination with mechanism for holding the axle at the rear of the slots and adapted to release the same at will, substantially as set forth.

2. In a rake, the main frame and rake-teeth forming part thereof and provided with horizontal slots, and an axle having bearings in the slots and provided with hooks for the attachment of horses, in combination with a lever and a connected rope passing about pulleys and secured to the axle, by which the axle is adapted to be held at the rear of the slots, substantially as set forth.

3. In a rake, the main frame and rake-teeth forming part thereof and provided with horizontal slots, shafts, or tongues, supports connecting said shafts with the axle and movable about it, hooks for the attachment of horses, and an axle having bearings in the slots, in combination with the rope attached to said axle, and the lever for drawing the rope and axle backwardly, substantially as set forth.

4. In a rake, the combination of the shafts, wheels, and axle with braces arranged in pairs and having loose connection with the axle, the members of each pair extended in diverging directions to a shaft and rigidly connected thereto, and transverse braces rigidly connected to each outer rake-tooth and to other braces connected to the main frame and extending beyond it and to the rear of the axle, substantially as set forth.

5. In a rake, the combination of the wheels and axle with the rake-frame, including braces 5, extending beyond the ends of the frame proper and to the rear of the axle, and with horizontal braces rigidly connecting each of said braces 5 at a point behind the axle with each of the outer rake-teeth at a point in front of said axle, substantially as set forth, whereby the rake is braced and the wheels guarded.

6. In a rake, the combination of the wheels, axle, and main frame with a rear wheel and its hinged support, and a seat, the hinged support being located under the seat and having a part thereof within reach of the driver's foot, substantially as set forth.

7. In a rake, the combination of the wheels, axle, and the main frame with a rear wheel and its hinged support, and a rearward extension from the frame above the wheel-support to limit its upward movement, said support being within reach of the driver's foot, substantially as set forth.

In testimony whereof I have signed this specification in the presence of two subscribing witnesses.

SAMUEL A. BLAKE.

Witnesses:
W. G. AGNEW,
F. L. GUCHES.